United States Patent [19]

Cope et al.

[11] Patent Number: 4,719,849
[45] Date of Patent: Jan. 19, 1988

[54] FOOD PRODUCT COOKER

[75] Inventors: Jonathan C. Cope; Michael E. Grady; Donald G. Warnock, all of Madera, Calif.

[73] Assignee: Valley Grain Products, Inc., Madera, Calif.

[21] Appl. No.: 927,959

[22] Filed: Nov. 7, 1986

[51] Int. Cl.⁴ ............................................. A47J 37/12
[52] U.S. Cl. ....................................... 99/404; 99/407; 99/427; 198/704
[58] Field of Search ................. 99/404, 353, 427, 426, 99/443 C; 198/704, 792

[56] References Cited

U.S. PATENT DOCUMENTS

| | | | |
|---|---|---|---|
| 1,343,184 | 6/1920 | Baker et al. | 198/704 X |
| 2,804,027 | 8/1957 | Hecht | 198/704 X |
| 4,171,739 | 10/1979 | Yamato | 99/443 C |
| 4,380,191 | 4/1983 | Gallegos et al. | 99/404 |
| 4,494,453 | 1/1985 | Bentson | 99/353 |

*Primary Examiner*—James Kee Chi
*Attorney, Agent, or Firm*—Harris, Kern, Wallen & Tinsley

[57] ABSTRACT

A food product cooker having a main frame with a cooking oil pan and a plurality of food product carriages driven about the frame to and from the pan, with each of the carriages including a food product holder having upper and lower sections for receiving and transporting the food product. Each of the carriages includes a holder having pivoted sections for receiving, retaining and molding the food product therebetween. Cam tracks and cam followers provide automatic control of the holder sections. The main drive chain moves the carriages from the unloading position to the loading position, and a separate carriage pusher chain moves the carriages through the cooking vat.

33 Claims, 13 Drawing Figures

FOOD PRODUCT COOKER

BACKGROUND OF THE INVENTION

This invention relates to food product cookers, such as cookers for frying tortillas, taco and enchilada shells, tostada bowls and similar food products. The invention will be described herein as embodied in a tostada bowl cooker which receives a baked flat tortilla and forms and frys the tortilla to produce a tostada bowl. It will be understood, of course, that the cooker of the invention can be utilized in producing other food products.

A variety of food product cookers have been utilized in the past, and two prior art devices which provide for continuous cooking of tortilla type products are show in U.S. Pat. Nos. 3,948,160 and 4,530,275.

While the earlier equipment has been used in production of food products, some problems have been encountered in speed of operation and equipment wear. In the machines of the prior art, the food product carriers are stacked together and are pushed as a group through the cooking vat. Also as the product carriers leave the overhead vat, they tend to run away downhill, and some form of braking is required to control the movement. Product removal after cooking is aided by bumping and shaking the carriers. These operations result in a slower and rougher operating machine.

Another disadvantage of the earlier machine is the need for manual supervision and aid during loading of the product to be cooked.

It is an object of the invention to provide a new and improved food product cooker and in particular, a cooker which provides an improvement in product quality with a reduction in product rejection rate, and an increase in rate of production.

It is another object of the invention to provide a cooker which is smoother and faster in operation, thus reducing wear and increasing production. A particular object is to provide for product loading without manual aid, and product unloading without inducing vibration.

These and other objects, advantages, features and results will more fully appear in the course of the following description.

SUMMARY OF THE INVENTION

A food product cooker having a main frame with a cooking oil pan and a plurality of food product carriages driven about the frame to and from the pan, with each of the carriages including a food product holder having upper and lower sections for receiving and transporting the food product, is improved by incorporation of a new carriage and holder construction. Each of the carriages includes a support arm with the main drive attached at one end of the arm and the food holder attached at the other end, with the holder having pivoting sections for receiving, retaining and molding the food product therebetween. Controls are provided for opening and closing the holder sections and locking the holder sections in the closed condition, and for pivoting the holder sections as a unit on the carriage. Cam tracks and cam followers provide automatic control of the holder sections. The main drive chain moves the carriages from the unloading position to the loading position, and a separate carriage pusher chain moves individual carriages through the cooking vat, providing for one spacing of carriages during cooking and another spacing of carriages during unloading and loading, with the cooking vat located at the lower section of the frame so that the cooked product is pulled up and out of the vat to the unloading position. Guides provide for loading the food product and ejector blades provide for unloading the cooked product. In the specific embodiment described and illustrated the food product holders are basket shaped for producing a bowl shaped product, and the holders will be referred to as baskets.

DESCRIPTION OF THE PREFERRED EMBODIMENT

Figure 1:
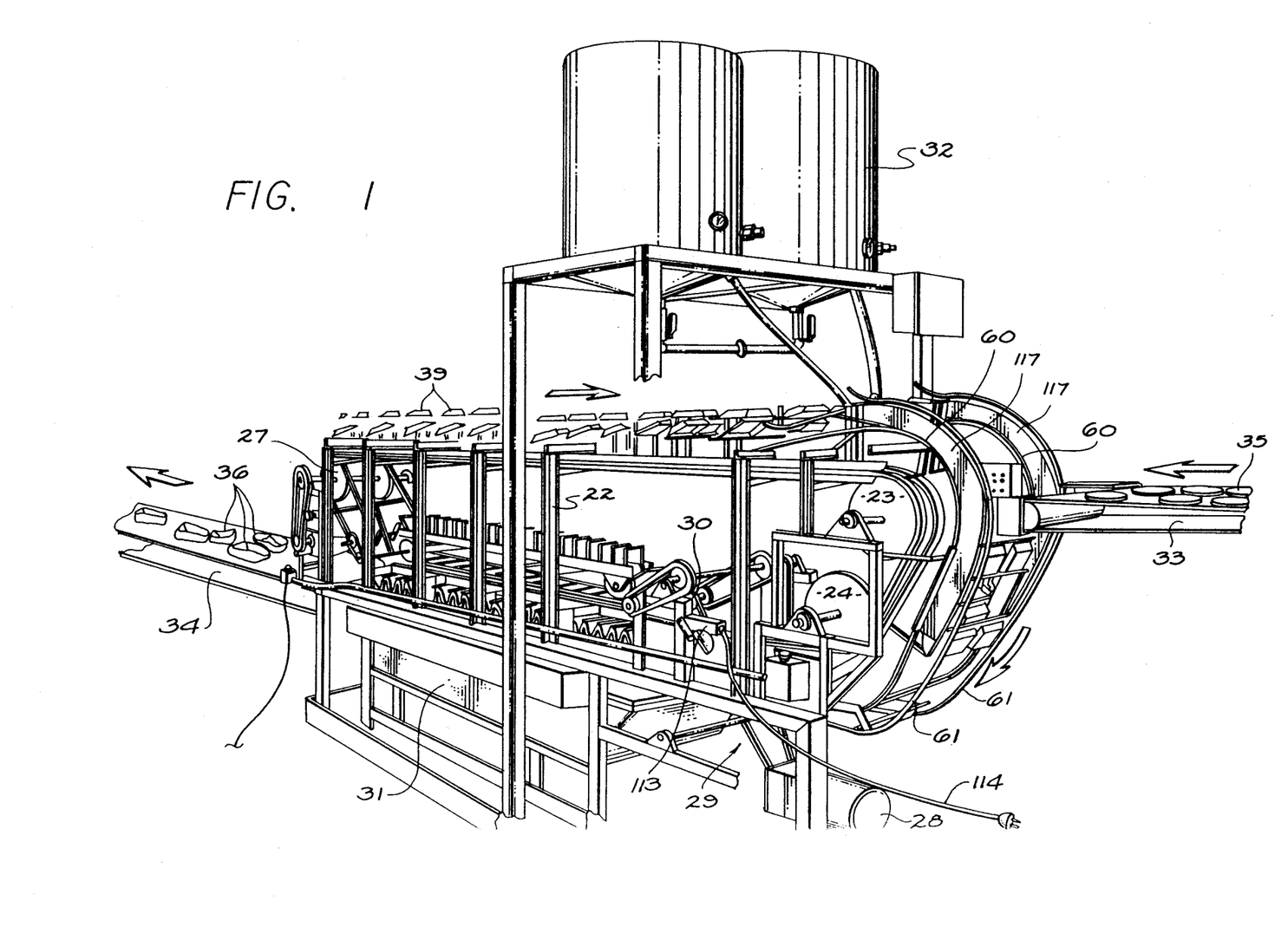
FIG. 1 is a perspective view of a tostada bowl cooker from the loading end, incorporating the presently preferred embodiment of the invention.
Figure 2:
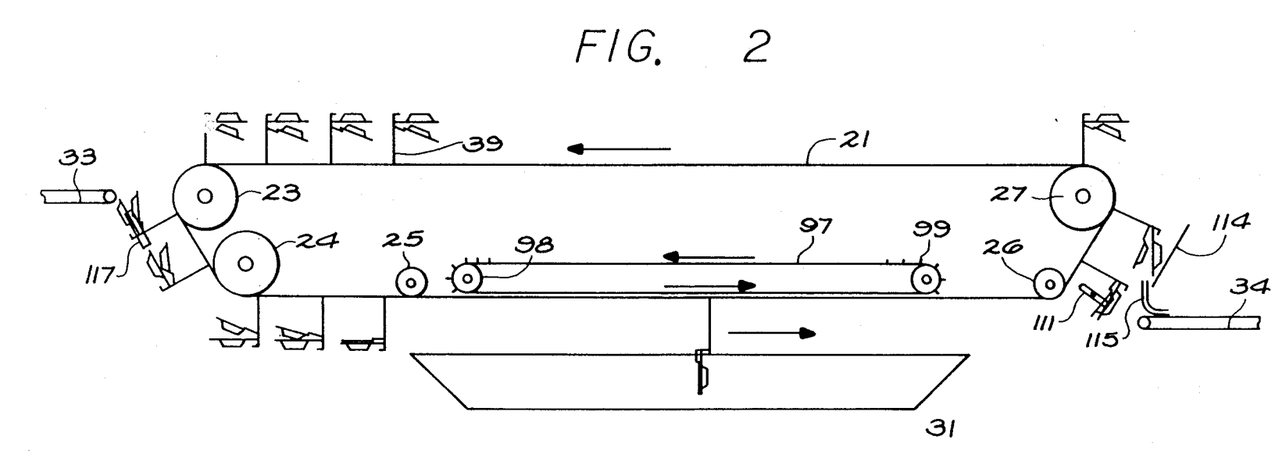
FIG. 2 is a diagrammatic side view of the cooker of FIG. 1 illustrating the positions of the food product baskets and carriages during the cooking cycle.
Figure 3:
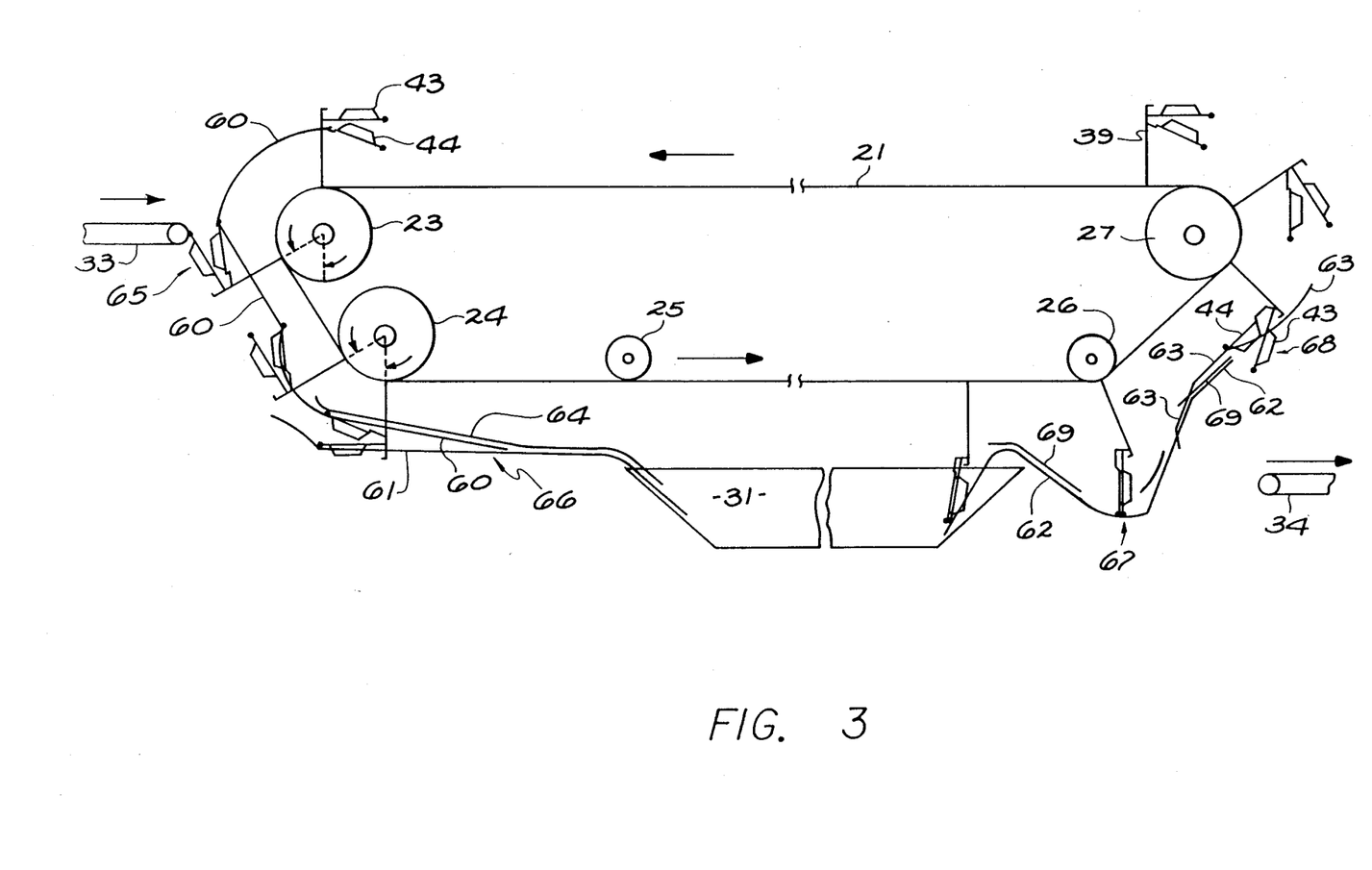
FIG. 3 is a view similar to that of FIG. 2 illustrating the operation of the cam tracks in controlling basket conditions and positions.

A food product cooker incorporating the present and preferred embodiment of the invention is illustrated in FIG. 1 and is shown diagramatically in FIGS. 2 and 3. A main drive chain 21 is supported in a main frame 22 on rollers, with rollers 23–27 being identified. Typically, the main drive chain 21 comprises two spaced endless metal link chains, and is driven by a motor 28 mounted on the frame 22, and coupled to a drive sprocket 30 by conventional reduction chains and sprockets indicated generally at 29.

A vat 31 for cooking oil is supported in the lower portion of the main frame, with oil being supplied from one or more tanks 32 carried at the upper end of the frame. The food product to be fried in the oil in the vat is delivered to the machine by a conveyer belt 33 at the loading end, and the cooked product is taken away from the machine by a conveyer belt 34 at the unloading end. The drum sprocket 30 is positioned adjacent the entry to the vat. Typically, the incoming food product is a flat baked tortilla 35, and the outgoing product is a bowl shaped fried tortilla known as a tostada.

Figure 5A:
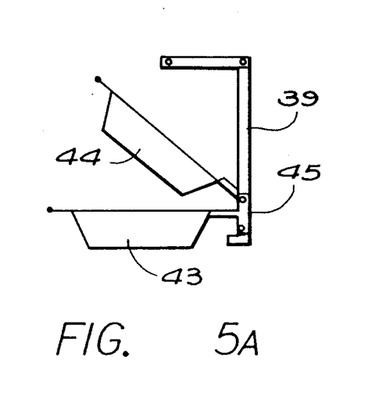
FIGS. 5A, 5B and 5C diagrammatically illustrate various conditions and positions of a basket on a carriage.
Figure 5B:
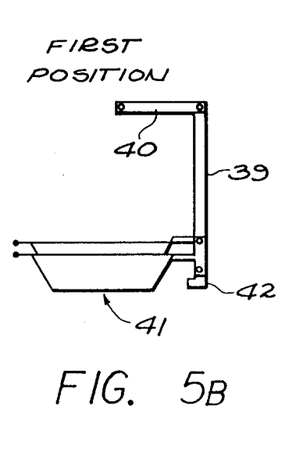
Figure 5C:
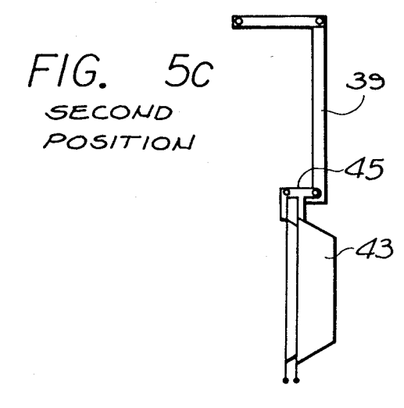

Food product carriages 39 are attached to the main drive chain 21 at spaced intervals. In the embodiment illustrated, a food product carriage is an 'L' shaped member which is attached to the main drive chain at one end 40 and which carries a product basket 41 at the other end 42. The product carriage configuration is shown diagramatically in FIGS. 5A–5C. The product basket 41 comprises two sections for receiving the food product therebetween, typically a female mold section 43 and a male mold section 44. The basket section 43 is carried on a support arm 45, which support arm is pivotally mounted on the carriage 39 at the basket end of 42, as shown in FIGS. 5A and 5C. The basket section 44 is pivotally mounted on the support arm 45, so that the section 44 can pivot between a basket open condition as shown in FIG. 5A and a basket closed condition as shown in FIGS. 5B and 5C. When the basket is in the closed condition, the entire basket can pivot between the horizontal position shown in 5B and the vertical position shown in 5C. The arrangement for controlling the basket positions will be described in greater detail herein below.

Figure 6:
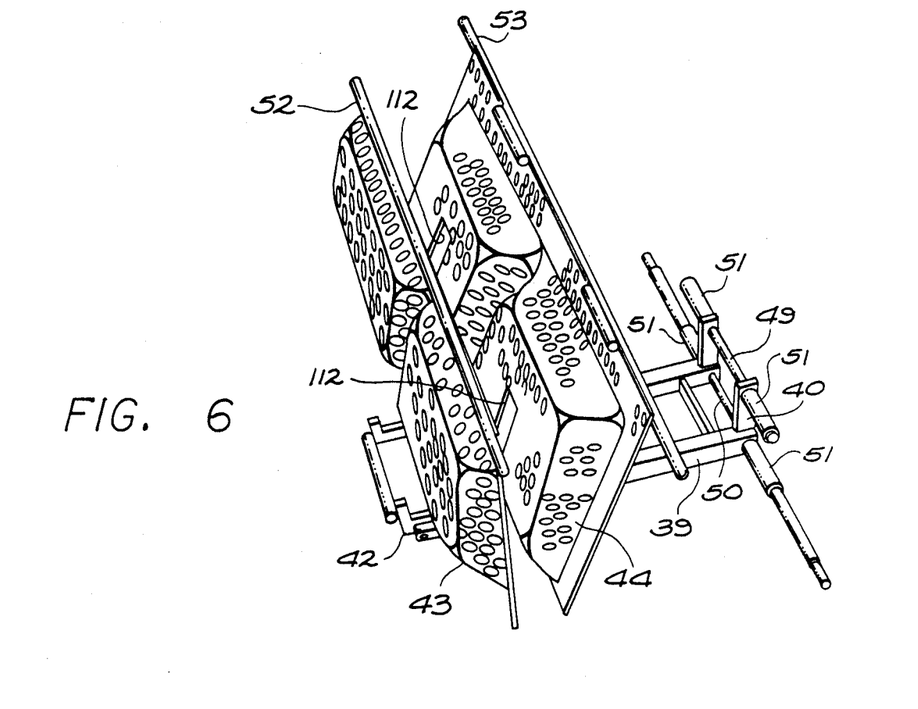
FIG. 6 is a perspective view of a carriage with the basket sections in the open condition.
Figure 7:
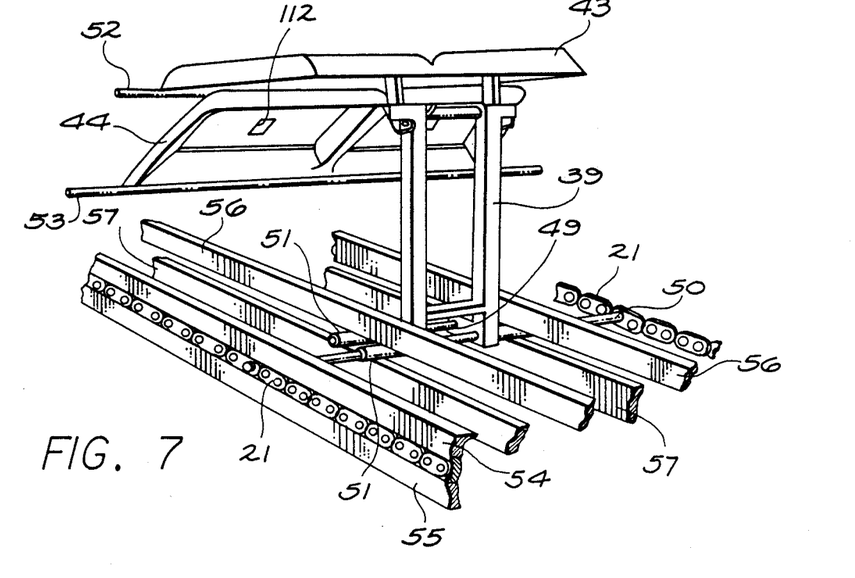
FIG. 7 is a perspective view of a carriage and basket on the support rails.

The carriage and basket assembly is shown in greater in FIGS. 6 and 7. The transverse support rods 49 and 50 are carried at the chain end 40 of the product carriage 39, with the rod 50 projecting further outward than the rod 49. Preferably, rollers 51 are carried on the rods 49 and 50 for reducing wear and friction. A transverse cam follower rod 52 is carried at the outer end of the basket section 43, and a transverse cam follower rod 53 is carried at the outer end of the basket section 44. In the embodiment illustrated, the cam follower rod 53 projects further outward than the cam follower rod 52.

Referring to FIG. 7, the main drive chain 21 moves between upper and lower rails 54, 55 which are supported on the main frame 22. Pairs of upper and lower support rails 56, 57 are also carried on the main frame 22, with the transfer support rods 49, 50 of each carriage positioned between the rails for supporting the carriage. Typically there are two main drive chains 21 disposed in parallel on opposite sides of the carriage rails, with the transfer support rod 50 of each carriage fastened between the two chains 21.

Figure 4:
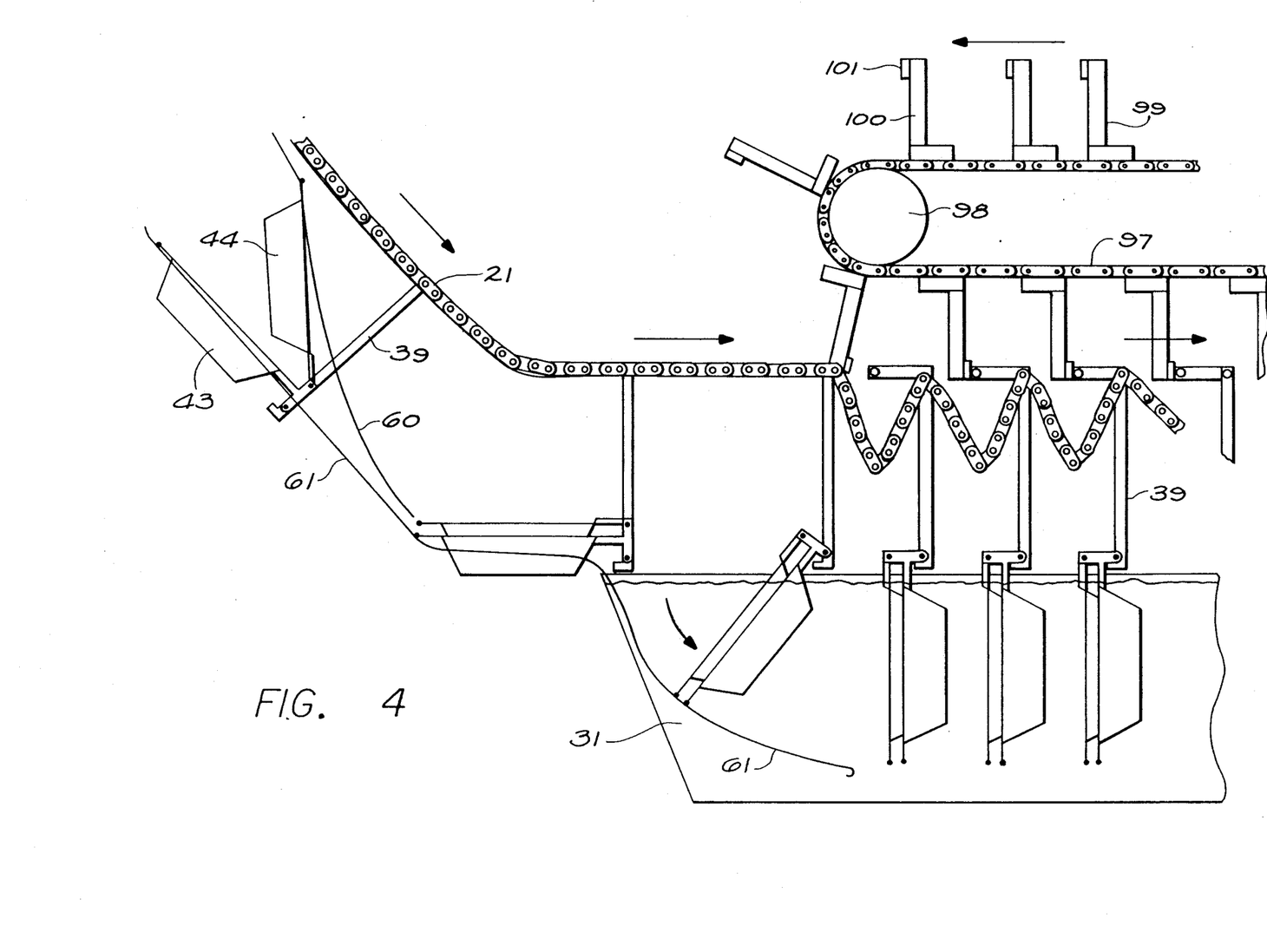
FIG. 4 is an enlarged partial view similar to that of FIGS. 2 and 3 illustrating the gathering of baskets and carriages during entry into the cooking oil.
Figure 9:
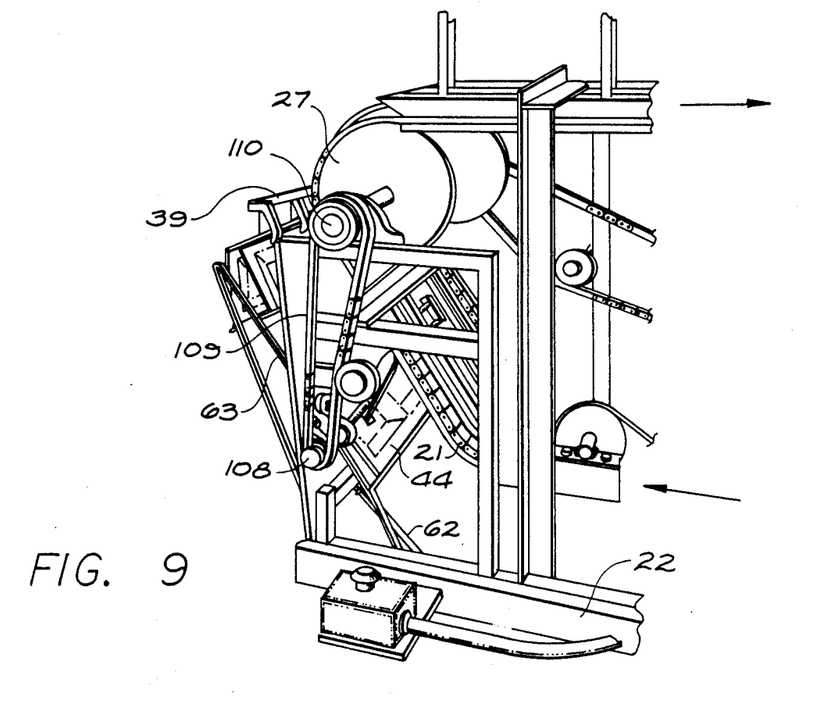
FIG. 9 is an enlarged partial view of the discharge end of the cooker of FIG. 1.

A plurality of cam tracks are mounted on the main frame and various portions of the cam tracks are shown in Figs. 1, 4 and 9. The cam tracks are shown diagramatically in FIG. 3 and include a first loading cam track 60, a second loading cam track 61, a first unloading cam track 62, and a second unloading cam track 63. These cam tracks and the follower rods 52, 53 of the basket sections are configured so that certain rods engage certain cam tracks at predetermined locations in order to control the positioning of the basket sections.

Referring specifically to FIG. 3, the carriages 39 are transported in a counter-clockwise direction from an upper position on the frame, past the loading belt 33 at the left end, through the vat 31, past the unloading belt 34 at the right end, and back to the upper position. As a carriage approaches the loading end, the cam follower rod of the basket section 44 engages the cam track 60 and the basket is retained in the open condition during the loading operation. A tortilla is fed into the basket section 43 at position 65, with the cam track 60 holding the basket in the open condition. As the loaded basket approaches position 66, the cam track 60 permits the basket section 44 to move downward under the influence of gravity to press the tortilla into the basket section 43, thereby obtaining the desired bowl shape. In the embodiment illustrated, an additional cam track 64 is positioned above the track 60 at position 66, with the cam follower rod of the basket section 44 moving between the tracks 60, 64 to provide additional molding pressure. The cam follower rod of the basket section 43 engages the cam track 61 to provide support for the basket during this molding operation. The cam track 60 now terminates and the closed basket is supported by the cam track 61. With the basket in the closed condition, the basket can now pivot from the first position of FIG. 5B to the second position of FIG. 5C, and this occurs as the basket moves into the vat 31. The basket latching and unlatching operation will be described in conjuction with FIG. 8 below.

As the basket moves toward the exit end of the vat 31, the cam follower rod of the basket section 43 engages the cam track 62 which pivots the basket upward to clear the end of the vat. After the basket exits the vat, the cam track 62 permits the basket to hang in a generally vertical position for draining excess cooking oil. As the basket moves upward from the draining position 67 toward the unloading position 68, the cam follower rod of the basket section 44 engages the cam track 63 to support the basket section 44. Then when the cam track 62 ends, the basket section 43 falls away from the basket section 44, allowing the cooked product to fall from the basket onto the conveyor 34. Sometimes the basket sections exhibit a tendency to bounce during operation. When it is desired to avoid bouncing, retainer tracks can be utilized adjacent the cam tracks. Retainer tracks 69 are illustrated in FIG. 3.

Figure 8:
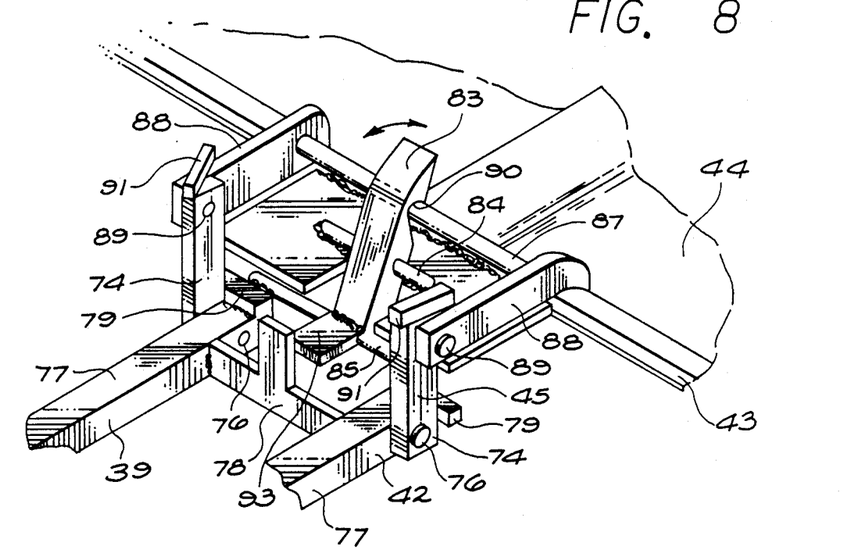
FIG. 8 is a perspective view illustrating the hinge mechanism of a basket on a carriage.

The basket latch mechanism is illustrated in greater detail in FIG. 8. The support arm 45 is formed of two bars 74 joined by a plate 75 with the basket section 43 attached to the plate. The bars 74 are pivoted on pins 76 at the basket end 42 of the product carriage 39. In the embodiment illustrated, the carriage is formed of two bars 77 with a T-shaped plate 78 welded therebetween. Two stop fingers 79 are carried at the ends of the bars 77, and serve as stops for limiting clockwise rotation of the basket section 43. In FIG. 8, the basket is shown in the closed condition and in the second position.

A latch 83 is pivotally mounted on a rod 84 which is attached to the plates 75, typically by welding. Another rod 85 is attached to the carriage at the stop fingers 79, and functions as a limit stop for the latch 83.

The basket section 44 is attached to another rod 87 which in turn is carried on bars 88, which bars are pivoted on the bars 74 at pins 89. A notch 90 is provided in the latch 83 for engaging the rod 87. Stop fingers 91 are carried at the upper ends of the bars 74 for limiting pivoting of the basket section 44 by engagement with the bars 88.

When in the position shown in FIG. 8, the latch 83 locks the basket in the closed condition. This is accomplished by engagement of the latch notch 90 with the rod 87 and engagement of the lower end of the latch with the rod 85.

When the two basket sections pivot as a unit in the counter-clockwise direction toward the first position, the tab 93 at the lower end of the latch 83 engages the upstanding finger of the T plate 78 and moves the upper end of the latch 83 away from the rod 87. This frees the basket section 44 and permits it to pivot away from the basket section 43, with the amount of pivoting being limited by the stops 91. The pivoting of the support arm 45 in the counter-clockwise direction is limited by engagement of the plate 75 with the bars 77.

In the operation just described, the basket has moved from the closed condition and second position as shown in FIG. 8 and FIG. 5C to the closed condition and first position as shown in FIG. 5B and on to the open condition as shown in FIG. 5A. As previously described in conjunction with FIG. 3, the movement of the basket sections is controlled by the engagement of the basket cam followers with the cam tracks.

The carriages 39 are moved from the exit of the vat, around the frame and back to the entrance to the vat by the main drive chain 21. A separate carriage pusher chain is utilized for moving the carriages through the cooking vat. The main drive chain 21 goes slack at the entrance to the vat so that the carriages can be positioned closer together, with the baskets in the second position, and the carriages are moved through the vat by a separate carriage pusher chain 97. This arrangement is shown in detail in FIGS. 4 and 11, and diagramatically in FIG. 2. Typically two spaced endless chains 97 are utilized, with the chains driven by sprockets 98 which may also be powered from the main drive motor 28. A plurality of pusher members 99 is carried on the pusher chain 97, with the pusher members 99 spaced apart the desired distance of spacing of the carriages 39 as they move through the cooking vat. Typically, each pusher member comprises a pair of L-shaped arms 100 with a cross bar 101 between.

Figure 11:
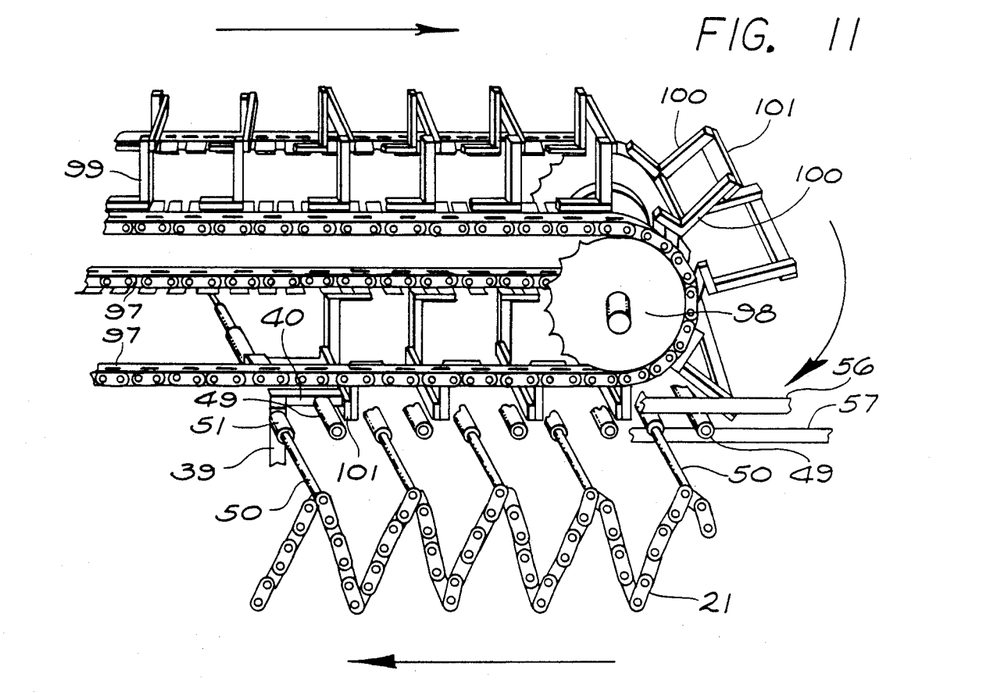
FIG. 11 is an enlarged partial view of a portion of FIG. 1 illustrating the operation of the carriage drive.

The transverse support rods 49, 50 of each carriage ride between support rails 56, 57 for supporting the carriages above the cooking vat. The main drive chain 21 goes slack as it approaches the vat, as shown in FIGS. 4 and 11. The chain is longer than the chain path around the frame and is not supported at the oil vat. The chain is pulled around the track on the frame by the drive sprocket 30 and therefore there is no tension in the chain at the vat, permitting the chain to stop at the entry to the vat. The pusher chain 97 is positioned so that the pusher members 99 will engage the carriages, preferably at the ends 40, and provide the force for moving the carriages through the vat. With this arrangement, the spacing of the baskets in the vat is determined by the spacing of the pusher members on the pusher chain, and the dwell time of the product in the vat is controlled by the speed of the drive chain and the spacing of the pusher members. At the exit end of the vat, the drive chain pusher members move upward away from the carriages, and the drive chain again provides the drive force for the carriages.

Figure 10:
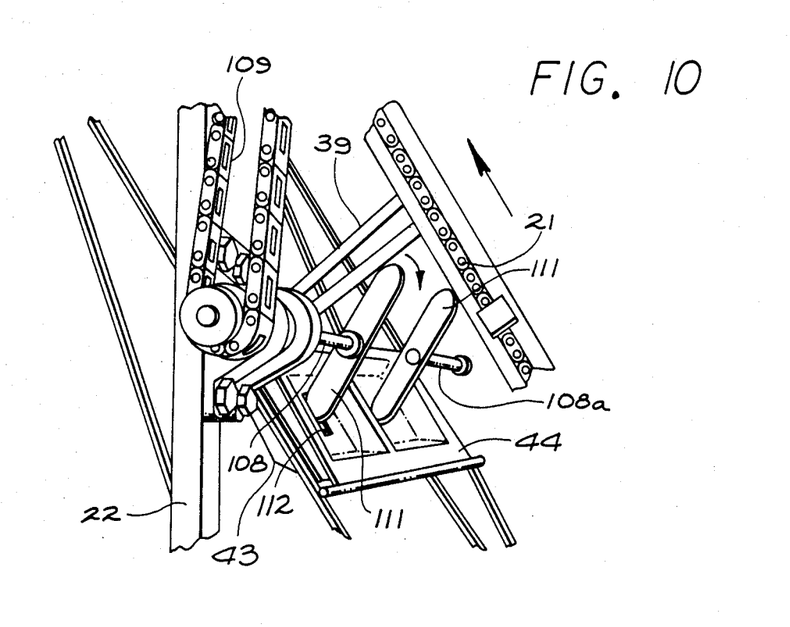
FIG. 10 is an enlarged partial view of the discharge end of FIG. 9 illustrating the ejector mechanism.

A product ejector is incorporated in the apparatus at the unloading end, for aiding in the transfer of a cooked product from the cooker to the conveyor 34. The product ejector is shown in FIG. 9 at the unloading end, and in greater detail in FIG. 10.

Shafts 108 and 108a are journaled in the main frame 22, with a gap between the shafts to provide clearance for the carriages 39. Each shaft is driven by a chain from another shaft 110 which also carries the roller 27, and one such chain 109 is shown.

Ejector blades 111 are mounted for rotation with the shafts 108, 108a, and are of a length to pass through the slots 112 in the basket section 44. See FIG. 6 for a larger view of the slots 112. The rotation of the blades 111 is synchronized with the carriage drive so that the tips of the blades pass through the slots in the basket sections without contacting the basket sections. At this point in the cycle of operation, the basket is in a slightly open condition with the open end facing downward, as seen in FIG. 9. The motion of the ejector blade through the basket section slot causes the food product to release from the basket section, which permits the cooked product to fall freely onto the conveyor 34 when the basket opens fully. This operation is illustrated diagramatically in FIG. 2, with the ejector blade 111 at the partially open basket and with a guide plate 114 and guide chute 115 leading from the open basket to the conveyer 34.

In the preferred embodiment of the invention, swinging gates are positioned at the end of the conveyor 33 for controlling dropping of the tortillas 35 into the open baskets. An indexer mechanism 113 is positioned upstream of the carriage pusher chain (FIG. 1) to provide a control signal for the operation of the gates. Typically, a cam is operated by the drive chain to close a microswitch and provide an electric signal via line 114 to the indexer gate, thus releasing one pair of tortillas per pair of baskets. This type of indexer mechanism is conventional with food product cookers of the type described herein. Guide plates 117 are mounted in the frame adjacent the baskets at the end of the conveyer 33 for guiding the product 35 into the baskets.

Thus it is seen that the cooker of the present invention provides an apparatus which can operate at higher speed, smoother and with less vibration and wear than conventional apparatus. The usual chain knocker for product release, the friction brake for carriage control, the manual aid at loading, and the stacking of product carriages in the cooking vat are eliminated.

We claim:

1. In a food product cooker having a main frame, a cooking oil pan, a plurality of product carriages, and a main drive endless chain for moving said carriages about said main frame to and from said pan, with each of said carriages including a food product holder having upper and lower sections for holding a food product therebetween, the improvement wherein each of said carriages includes a support arm having first and second ends, with said drive chain attached at said first end and with said holder attached at said second end, said holder including means for pivoting said holder sections relative to each other between open and closed conditions and means for pivoting said holder between first and second positions relative to said support arm when said holder sections are in said closed condition.

2. A food product cooker as defined in claim 1 wherein said holder pivoting means includes first means for pivotally mounting one of said holder sections at said support arm second end, and second means for pivotally mounting the other of said holder sections at said first holder section.

3. A food product cooker as defined in claim 1 wherein each of said holder sections includes a cam follower, and said frame includes product loading and unloading sections, with first and second loading cam tracks at said loading section for engaging said holder section cam followers in controlling relation.

4. A food product cooker as defined in claim 3 including means for delivering an uncooked food product into a holder between said holder sections when in said open condition, with said upper holder section cam follower engageable with said first loading cam track for supporting said upper holder section in said open condition during food product loading, and with said first loading cam track contoured to move said upper holder section to said closed condition on completion of food product loading.

5. A food product cooker as defined in claim 4 with said lower holder section cam follower engageable with said second loading cam track for supporting said holder in said first position on transition of said holder sections from said open condition to said closed condition, and
   with said second loading cam track contoured to permit movement said holder to said second position on entering said vat.

6. A food product cooker as defined in claim 3 wherein said frame includes first and second unloading cam tracks at said unloading section for engaging said holder section cam followers in controlling relation.

7. A food product cooker as defined in claim 6 including means for transporting a cooked food product from a holder when said holder sections are in said open condition,
   with said holder section cam followers engageable with said unloading cam tracks for moving said holder sections toward said open condition.

8. A food product cooker as defined in claim 7 with said upper holder section cam follower engagable with said second unloading cam track for supporting said upper holder section, and
   with said first unloading cam track contoured to permit movement of said lower holder section away from said upper holder section to said open condition.

9. A food product cooker as defined in claim 8 wherein said product unloading section includes means for guiding said drive chain from a lower position with a carriage depending from said drive chain to an upper position with a carriage resting on said drive chain permitting a holder to pivot from said second holder position to said first holder position, with said holder sections in said open condition.

10. A food product cooker as defined in claim 1 wherein each of said holder sections includes a cam follower, and
   said frame includes a product unloading section with first and second unloading cam tracks at said unloading section for engaging said holder section cam follower in controlling relation.

11. A food product cooker as defined in claim 10 including means for transporting a cooked food product from a holder when said holder sections are in said open condition,
   with said holder section cam followers engagable with said unloading cam tracks for moving said holder sections toward said open condition.

12. A food product cooker as defined in claim 11 with said upper holder section cam follower engagable with said second unloading cam track for supporting said upper holder section, and
   with said first unloading cam track contoured to permit movement of said lower holder section away from said upper holder section to said open condition.

13. A food product cooker as defined in claim 12 wherein said product unloading section includes means for guiding said drive chain from a lower position with a carriage depending from said drive chain to an upper position with a carriage resting on said drive chain permitting a holder to pivot from said second holder position to said first holder position, with said holder sections in said open condition.

14. A food product cooker as defined in claim 1 including:
   a carriage pusher chain mounted in said main frame above said vat;
   a plurality of pusher members carried on said pusher chain in spaced relation; and
   support means for supporting said pusher chain above said cooking pan and carriages with pusher members in engagement with individual carriage arm first ends while carriages move through said pan for spacing carriages from one another and for pushing carriages through said vat.

15. A food product cooker as defined in claim 1 wherein said holder lower section includes a depressed portion and said holder upper section includes a corresponding projecting portion, with said portions nesting to produce a bowl shaped product from a flat product when brought together.

16. A food product cooker as defined in claim 15 wherein said holder upper section includes an access opening in said projecting portion, and including
   ejector finger means mounted in said main frame for projecting through said access opening, and
   means for moving said ejector finger means in synchronism with said drive chain for actuating said ejector finger means as a holder is driven thereby.

17. A food product cooker as defined in any one of claims 1-13 and 14-16 wherein each of said carriages includes a first transverse support rod at said first end of said support arm, and
   said frame includes a lower support rail disposed over said pan, with said lower support rail disposed for supporting engagement with said carriage support rods for supporting said drive chain and front end of each of said carriage support arms above said pan.

18. A food product cooker as defined in claim 17 with said first support rods projecting outward past said rails and connecting with said drive chain.

19. A food product cooker as defined in claim 18 wherein each of said carriages includes a bracket fixed at an angle to said support arm first end, and
   a second traverse support rod at said bracket and spaced from said first support rod.

20. A food product cooker as defined in claim 19 wherein said support rail includes spaced upper and lower sections, and
   each of said support rods includes a roller for positioning between said spaced rail sections.

21. In a food product cooker having a main frame, a cooking oil pan, a plurality of product carriages, and a main drive endless chain for moving said carriages about said main frame to and from said pan, with each of said carriages including a food product holder having upper and lower sections for holding a food product therebetween,
   the improvement wherein each of said carriages includes a support arm having first and second ends, with said drive chain attached at said first end and with said holder attached at said second end,
   said holder including means for pivoting said holder sections relative to each other between open and closed conditions and means for pivoting said holder between first and second positions when said holder sections are in said closed condition, and
   releasable latch means for latching said holder sections in said closed condition.

22. A food product cooker as defined in claim 21 wherein said latch means includes a latch pivotally mounted on said first means, said latch having a first extention for engaging said second means in locking relation, and a second extention for engaging said carriage support arm second end in latch release relation, with said latch second extention and said arm second end disposed to engage each other when said holder pivots from said second position to said first position, to pivot said latch first extention away from said second means.

23. A food product cooker as defined in claim 22 wherein said carriage support arm second end and said first means include first interengaging stop means for defining said first position and a second interengaging stop means for defining said second position, and said first and second means include third interengaging stop means for defining said open condition.

24. In a food product cooker having a main frame, a cooking oil pan, a plurality of product carriages and a main drive endless chain for moving said carriages about said main frame to and from said pan, the improvement including in combination:

a carriage pusher chain mounted in said main frame above said vat;

a plurality of pusher members carried on said pusher chain in spaced relative; and support means for supporting said pusher chain above said cooking pan and carriages, with pusher members in engagement with individual carriages while carriages move through said pan for spacing carriages from one another and for pushing carriages through said vat.

25. A food product cooker as defined in claim 24, wherein each of said carriages includes a first transverse support rod connected to said main chain, and said frame includes a support rail disposed over said vat, for supporting engagement with said carriage support rods.

26. A food product cooker as defined in claim 25 wherein each of said carriages includes a second transverse support rod spaced from said first support rod, said support rail includes spaced upper and lower sections, and each of said support rods includes a roller for positioning between said spaced rail sections.

27. In a food product cooker having a main frame, a cooking oil pan, a plurality of product carriages, and a main drive endless chain for moving said carriages about said main frame to and from said pan, with each of said carriages including a food product holder having upper and lower sections for holding a food product therebetween, the improvement wherein each of said carriages includes a support arm having first and second ends, with said drive chain attached at said first end and with said holder attached at said second end, and each of said upper and lower holder sections includes a cam follower, and said frame includes product loading and unloading sections, with first and second loading cam tracks at said loading section for engaging said upper and lower holder section cam followers in controlling relation.

28. A food product cooker as defined in claim 27 including means for delivering an uncooked food product into a holder between said holder sections when in said open condition, with said upper holder section cam follower engageable with said first loading cam track for supporting said upper holder section in said open condition during food product loading, and with said first loading cam track contoured to move said upper holder section to said closed condition on completion of food product loading.

29. A food product cooker as defined in claim 28 with said lower holder section cam follower engageable with said second loading cam track for supporting said holder in said first position on transition of said holder sections from said open conditon to said closed condition, and with said second loading cam track contoured to permit movement said holder to said second position on entering said vat.

30. A food product cooker as defined in any one of claims 27–29 wherein said frame includes first and second unloading cam tracks at said unloading section for engaging said holder section cam followers in controlling relation.

31. A food product cooker as defined in claim 30 including means for transporting a cooked food product from a holder when said holder sections are in said open condition, with said holder section cam followers engageable with said unloading cam tracks for moving said holder sections toward said open condition.

32. A food product cooker as defined in claim 31 with said upper holder section cam follower engageable with said second unloading cam track for supporting said upper holder section, and with said first unloading cam track contoured to permit movement of said lower holder section away from said upper holder section to said open condition.

33. A food product cooker as defined in claim 32 wherein said product unloading section includes means for guiding said drive chain from a lower position with a carriage depending from said drive chain to an upper positon with a carriage resting on said drive chain permitting a holder to pivot from said second holder position to said first holder positon, with said holder sections in said open condition.

* * * * *